(12) United States Patent
Kobayashi

(10) Patent No.: US 6,356,306 B1
(45) Date of Patent: Mar. 12, 2002

(54) DIGITAL CAMERA CAPABLE OF CONVERTING A PROGRESSIVE SCAN SIGNAL INTO AN INTERLACE SCAN SIGNAL

(75) Inventor: Akio Kobayashi, Kyotanabe (JP)

(73) Assignee: Sanyo Electric Co., Ltd. (JP)

( * ) Notice: Subject to any disclaimer, the term of this patent is extended or adjusted under 35 U.S.C. 154(b) by 0 days.

(21) Appl. No.: 09/027,056

(22) Filed: Feb. 20, 1998

(30) Foreign Application Priority Data

Feb. 28, 1997 (JP) .............................. 9-045473
Nov. 26, 1997 (JP) .............................. 9-324274

(51) Int. Cl.$^7$ .............................................. H04N 5/335
(52) U.S. Cl. ..................................... 348/322; 348/231
(58) Field of Search ................................ 348/207, 220, 348/222, 223, 231, 232, 233, 272, 273, 281, 282, 311, 320, 321, 322, 323, 324, 451, 904; H04N 5/335

(56) References Cited

U.S. PATENT DOCUMENTS

| | | | |
|---|---|---|---|
| 4,730,212 A | 3/1988 | Wojcik et al. | |
| 5,182,644 A | * 1/1993 | Kimata et al. | ............... 348/451 |
| 5,195,182 A | 3/1993 | Sasson | |
| 5,576,760 A | 11/1996 | Akiyama | |
| 5,592,237 A | 1/1997 | Greenway et al. | |
| 5,751,350 A | * 5/1998 | Tanaka | ........................ 348/231 |
| 5,828,406 A | * 10/1998 | Parulski et al. | ............. 348/220 |
| 5,920,343 A | * 7/1999 | Watanabe et al. | ........... 348/222 |

FOREIGN PATENT DOCUMENTS

| | | |
|---|---|---|
| EP | 0 651 553 | 5/1995 |
| EP | 0 685 969 | 12/1995 |
| EP | 0 720 388 | 7/1996 |

* cited by examiner

Primary Examiner—Tuan Ho
(74) Attorney, Agent, or Firm—Michaelson & Wallace; Peter L. Michaelson

(57) ABSTRACT

A digital camera includes a CPU. The CPU releases a bus according to a bus-release request from a memory control circuit, and supplies a bus grant signal to the memory control circuit. Accordingly, the image data from a first signal processing circuit is written into a VRAM according to DMA. When the writing of the image is ended, the memory control circuit cancels the bus release request. The CPU accesses to the VRAM through the bus, to utilize the VRAM as a working memory.

22 Claims, 19 Drawing Sheets

FIG. 2

| | | | | | | | | |
|---|---|---|---|---|---|---|---|---|
| R | G | R | G | R | | G | R | G |
| G | B | G | B | G | ... | B | G | B |
| R | G | R | G | R | | G | R | G |
| | | ⋮ | | | | | ⋮ | |
| R | G | R | G | R | ... | G | R | G |
| G | B | G | B | G | | B | G | B |

| HIGHER ORDER 8 BITS | Y | Y | Y | Y | Y | Y | Y | Y | Y | Y |
|---|---|---|---|---|---|---|---|---|---|---|
| LOWER ORDER 8 BITS | B−Y | R−Y | B−Y | R−Y | B−Y | R−Y | B−Y | R−Y | B−Y | R−Y |
| | CC | CC | CC | CC | CC | CC | CC | CC | CC | CC |

FIG. 14
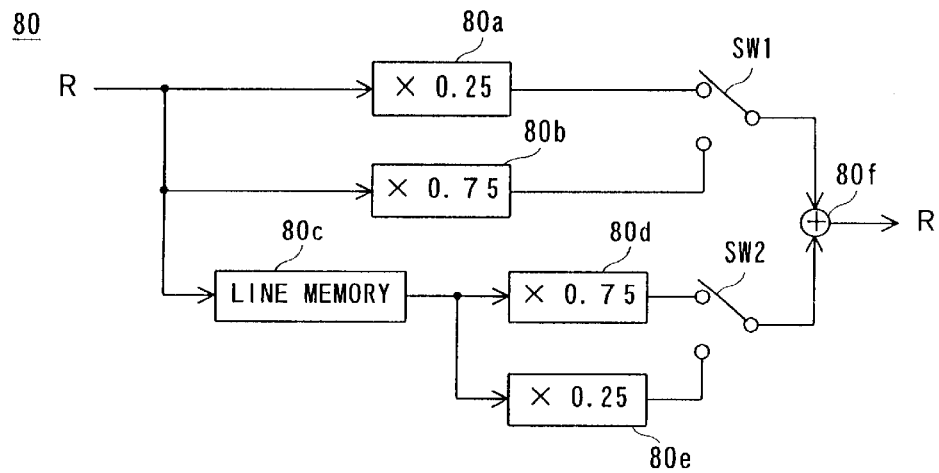
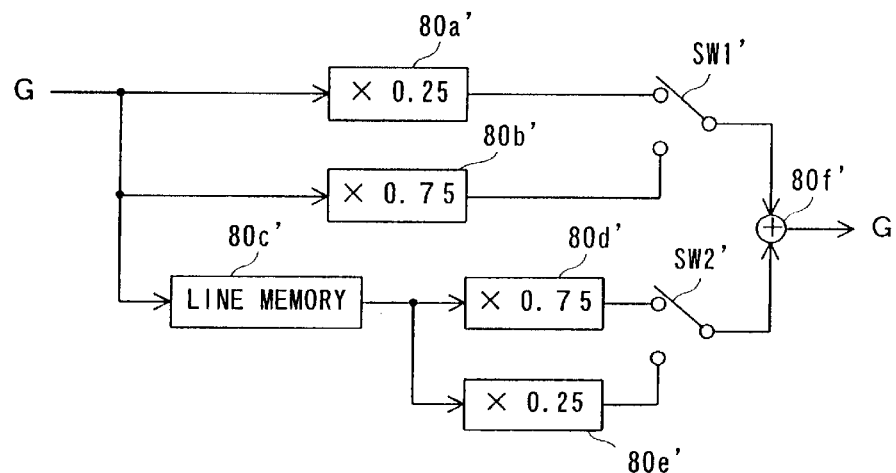
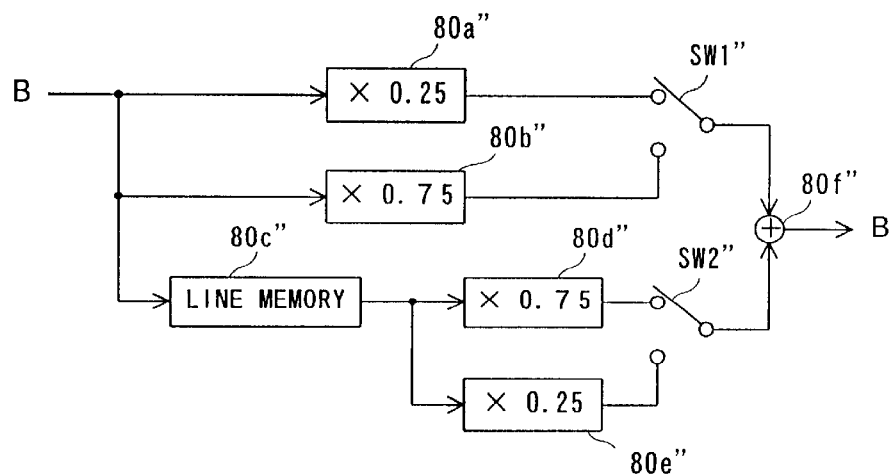

DIGITAL CAMERA CAPABLE OF CONVERTING A PROGRESSIVE SCAN SIGNAL INTO AN INTERLACE SCAN SIGNAL

BACKGROUND OF THE INVENTION

1. Field of the Invention

This invention relates to digital cameras, and more particularly to a digital camera which is adapted to convert an image signal outputted, for example, from a CCD imager into image data, and supply the image data to an output circuit through a memory such as a VRAM.

2. Description of the Invention

The conventional digital camera of this kind uses a memory for temporarily storing image data and a DRAM (Dynamic Random Access Memory) having, for example, 4M bytes having a function as a working memory for the CPU, wherein a VRAM (Video RAM) of, for example, 1M byte is provided separately from the VRAM in order to store the data to be displayed on a monitor.

In this manner, the conventional digital camera requires two memories and accordingly, there exist problems of not only difficulties in size reduction but also high cost.

SUMMARY OF THE INVENTION

Therefore, it is a primary object of this invention to provide a digital camera that is low in price.

It is another object of this invention to provide a digital camera that is reduced in price and size by decreasing the number of memories used therefor.

According to this invention, a digital camera adapted to convert a progressive scan signal as an image signal into an interlace scan signal, comprises: a signal output means for outputting a progressive scan signal; a memory means for storing the progressive scan signal; a bus for connecting between the signal output means and the memory means; a request output means for outputting a request signal that request a release of the bus; a CPU for responding to the request signal to output a grant signal that grants the release of the bus; a writing means for responding to the grant signal to write the progressive scan signal into the memory means; and a reading means for reading from the memory means and odd-numbered field related signal related to an odd-numbered field and an even-numbered field related signal related to an even-numbered field.

The CPU releases the bus in response to the request signal. The writing means writes the progressive scan signal according, for example, to DMA (Direct Memory Access) into the memory means through the bus. At this time, the memory means of the CPU is prohibited from being accessed. When the writing of the image signal into the memory means is ended, a request output means cancels the request signal. In response thereto, the CPU can access to the memory means through the bus. Therefore, the memory at this time is utilized as a working memory for the CPU. Since the memory means can be utilized not only as a VRAM for storing image signals but also a working memory for the CPU, it is possible to reduce the number of memories as compared to that of the conventional art. It is therefore possible to obtain an inexpensive and small-sized digital camera.

The memory means, preferably, includes a memory having a plurality of memory locations each having a plurality number of bits, an input port for inputting therein the progressive scan signal and an output port for outputting therefrom the odd-number field related signal and the even-numbered field related signal.

In one aspect of this invention, the writing means writes an odd-numbered line of the progressive scan signal into higher-order bits, and an even-numbered line of the progressive scan signal into the lower-order bits of the progressive scan signal. Also, the reading means simultaneously reads the image signals written in the higher-order bits and the lower-order bits of the reading means to obtain 1 line of the odd-numbered field related signal or even-numbered field related signal.

In one embodiment of this invention, a CCD imager has a color filter having a same color arrangement repeated on every 2 lines. The progressive scan signal is created based on the output of the CCD imager. An RGB signal creating means creates an RGB signal based on the 1 line of interlace scan signal.

In another aspect of this invention, the writing means writes the progressive scan signal at a first high-speed clock rate, that is more than twice a reference clock rate, into the memory means, and the reads means separately reading the odd-numbered field related signal and the even-numbered field related signal at a second high-speed clock rate, more than twice the reference clock rate, from the memory means. The odd-numbered field related signal and the even-numbered field related signal thus read correspond to an interlace scan signal. Since the progressive scan signal is written at the high-speed clock rate into the memory means and the odd-numbered field related signal and the even-numbered field related signal are separately read at the high-speed clock rate from the memory means, the memory means can use a single-port memory, thus reducing cost.

In a preferred embodiment of this invention, the writing means writes the progressive scan signal inputted at the reference clock rate into the frame memory through a first line memory having a capacity of 1 line. Meanwhile, the reading means reads 2 lines of the progressive scan signal at one time from the frame memory to obtain an odd-numbered field related signal or even-numbered field related signal. The odd-numbered field related signal and the even-numbered field related signal are outputted at the reference clock rate through the second line memory having a capacity of 2 lines.

Further, according to this invention, a digital camera, comprises: a CCD imager; an image data output means for outputting image data based on an image signal from the CCD imager; a memory having a plurality of memory locations each configured by a plurality of bits and an input port and an output port respectively connected to a writing bus and a reading bus; a CPU; a bus for connecting between an output of the image data output means, the writing bus and the CPU; a memory control means for outputting a bus release request to the CPU to write the image data from the image data output means through the bus to the memory; and an output circuit for processing the image data outputted from the reading bus.

The image signal from the CCD imager is supplied, for example, through a CDS/AGC to an A/D converter included in the image data output means where it is converted into image data. The image data is further subjected, for example, to digital-clamping, white-balance adjustment, and gamma-correction by the image data output means, and then outputted from the image data output means.

The memory control means provides a bus release request, e.g. BUSREQUEST, to the CPU. The CPU responds to this bus release request to end a process being executed, to send back a grant of using the first bus, e.g. BUSGRANT, to the memory control means and release the first bus. Consequently, at this time the image data from the image data output means is supplied, according to DMA (Direct Memory Access), to a writing bus for the memory through the first bus. At this time, the CPU memory is prohibited from being accessed.

When the writing of the image data into the memory is ended, the memory control means cancels the bus release request. In response thereto, the CPU becomes accessible to the memory through the first bus and writing bus. Therefore, at this time the memory is utilized as a working memory for the CPU.

According to this invention, the memory can be utilized not only, for example, as a VRAM for storing image data but also as a working memory for the CPU, thereby making it possible to reduce the number of memories as compared with the conventional art. It is therefore possible to obtain a digital camera that is inexpensive and has a reduced size.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 2 is an illustrative view showing one example of a color filter of a CCD imager in the FIG. 1 embodiment;

FIG. 8 is an illustrative view showing one example of the image data reproduced on the VRAM in the FIG. 1 embodiment;

FIG. 14 is a block diagram showing a pseudo frame signal creating circuit;

DETAILED DESCRIPTION OF THE PREFERRED EMBODIMENT

Figure 1:
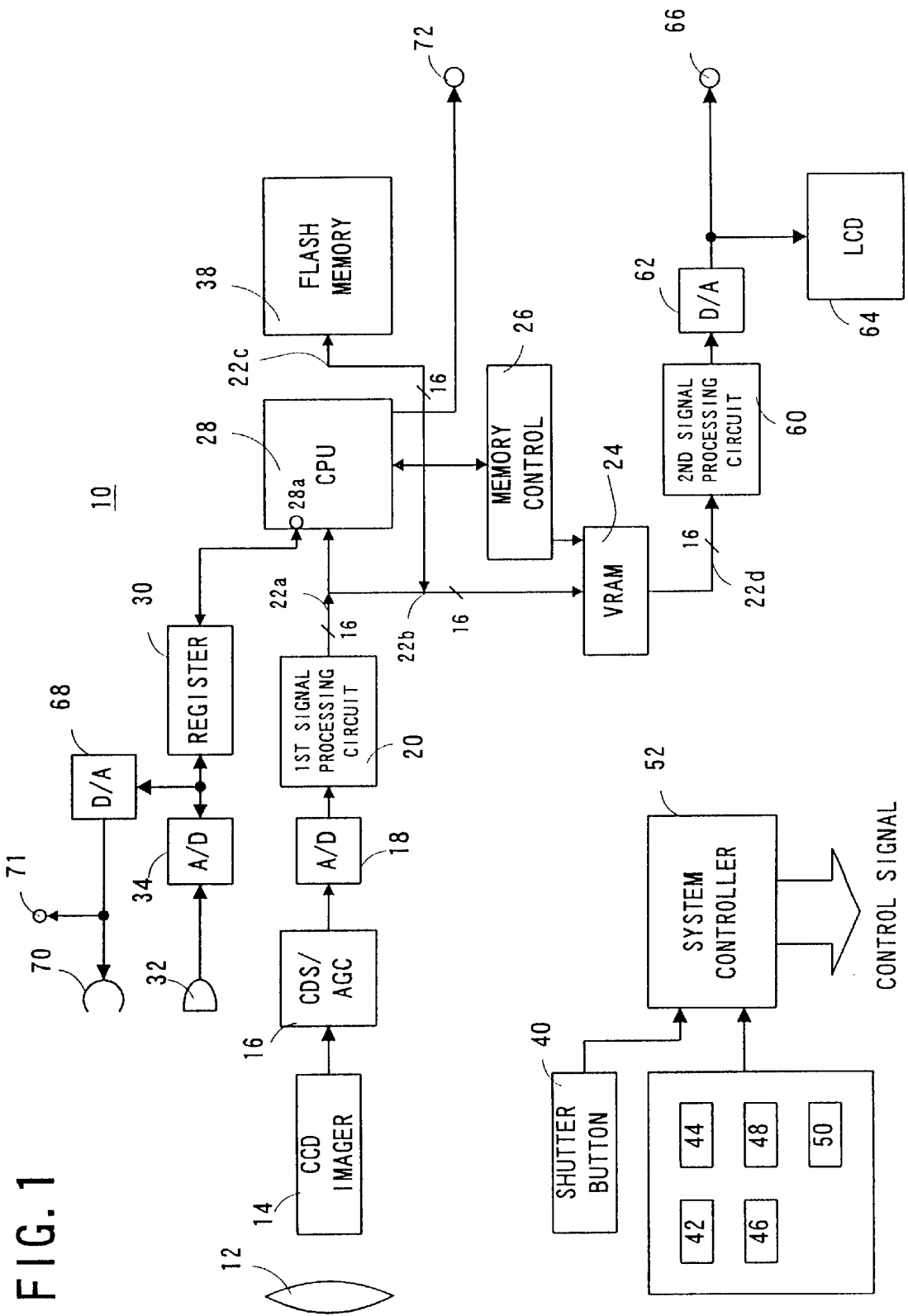
FIG. 1 is a block diagram showing one embodiment of this invention.

Referring to FIG. 1, a digital camera 10 of this embodiment includes a lens 12. Through this lens 12 is given an optical image which is converted into an electric signal by a CCD imager 14. The CCD imager 14 has a color filter, for example, in a primary color Bayer arrangement so as to output an electric signal (progressive scan signal) for each pixel according to progressive scan (pixel sequential scan). That is, the color filter of the CCD imager 14 has a color arrangement having a same color repeated on every two lines. For example, a first line has R and G alternately arranged, i.e. at every other pixel, while a second line has G and B alternately arranged, at every other pixel.

The progressive scan signal from the CCD imager 14 is supplied to a CDS/AGC circuit 16. The CDS/AGC circuit 16 subjects well-known noise removal and level adjustment to the progressive scan signal from the CCD imager 14. The progressive scan signal processed by this CDS/AGC circuit 16 is converted into digital data by an A/D converter 18. The digital data of the progressive scan signal outputted from the A/D converter 18 is supplied to a first signal processing circuit 20. The first signal processing circuit 20 subjects well-known white-balance adjustment and gamma-correction to the digital data (image data) outputted from the A/D converter 18 to output the image data to a 16-bit data bus 22a. Note that since the image data is 8 bits, an odd-line (first line) is outputted to higher-order 8 bits and an even line (second line) is outputted to lower-order 8 bits.

Figure 3:
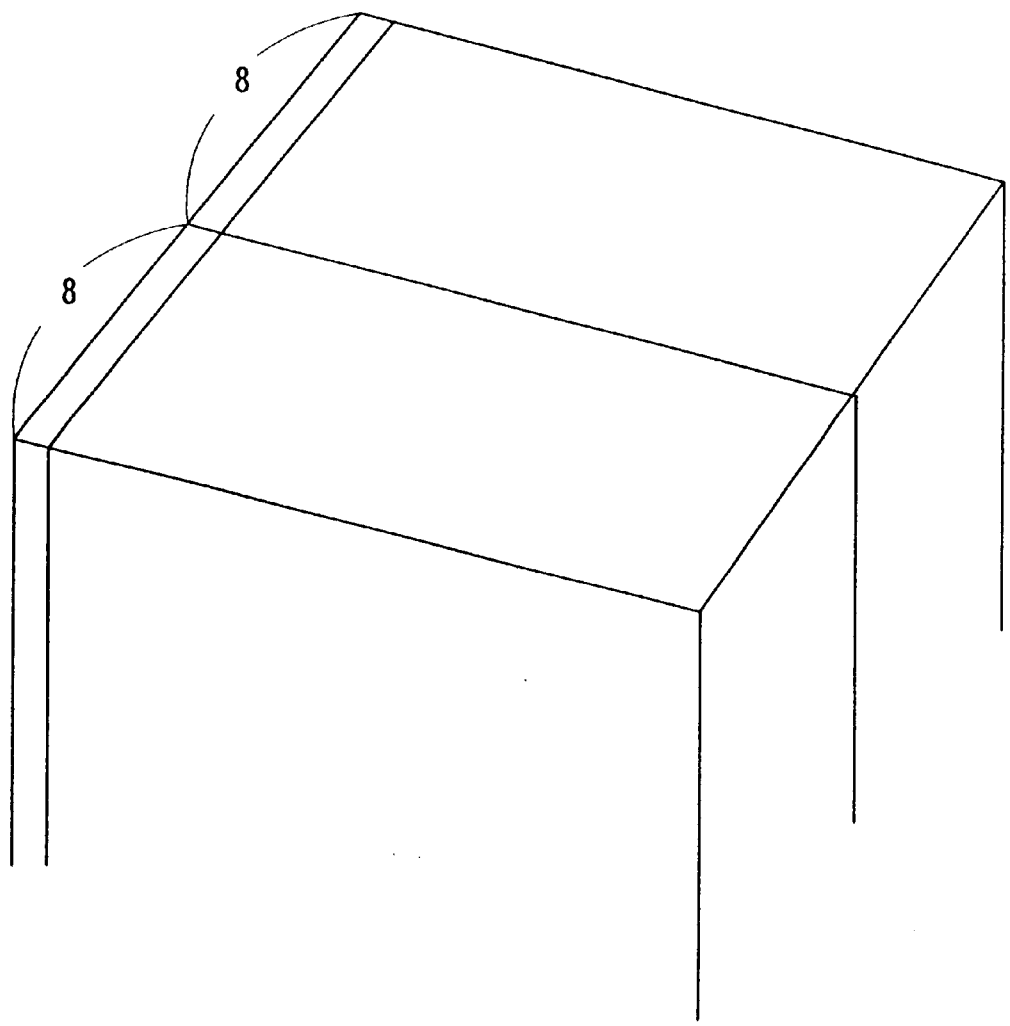
FIG. 3 is an illustrative view showing memory locations of a VRAM (or flash memory) in the FIG. 1 embodiment.

The VRAM 24 memorizes the image data from the first signal processing circuit 20, the data for the CPU 28, etc. according to the control of the memory control circuit 26 or under the control of the CPU 28. This VRAM 24 is structured, for example, by a dual-port RAM so that it can write through an input bus 22a and simultaneously read through an output bus 22d. The VRAM 24, as shown in FIG. 3, has memory locations each configured by 16 data bits. In this embodiment, the odd-line data contained in the image data from the first signal processing circuit 20 is memorized into higher-order 8 bits and the even-line data thereof to lower-order 8 bits.

The VRAM 24 is used principally to display to images on an LCD 64, and it is satisfactory to have a basic capacity of approximately 310 K bytes. In this embodiment, however, a VRAM 24 having a capacity of 512 K bytes is used. Consequently its area, except for the area used for image displaying, is utilized as a working memory for the CPU 28, or for temporarily retreating a program from a flash memory 38. The VRAM 24 has an input bus 22b of 16 bits connected to the CPU 28.

Figure 4:
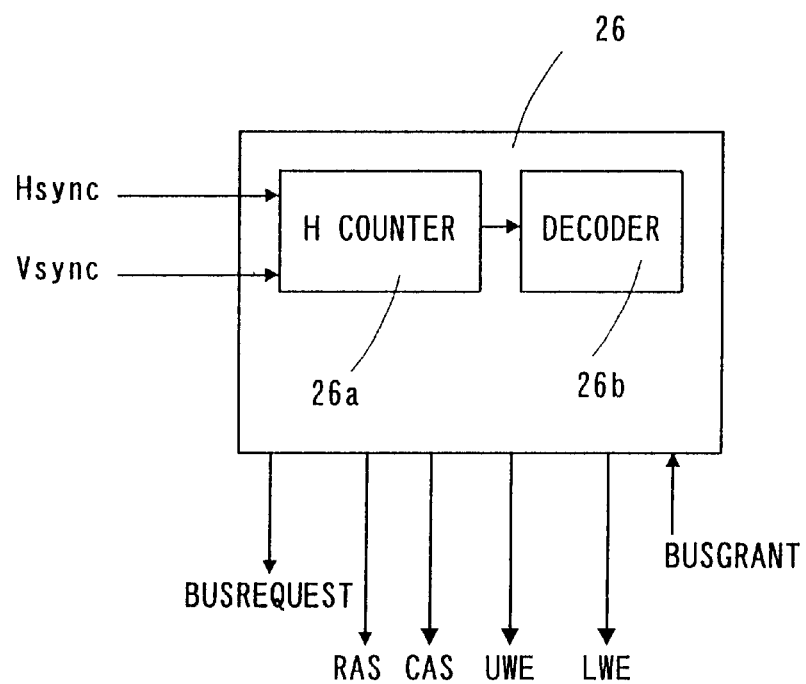
FIG. 4 is a block diagram showing one example of a memory control circuit in the FIG. 1 embodiment.

The memory control circuit 26 includes, in detail, an H counter 26a for receiving a horizontal synchronizing signal Hsync and a vertical synchronizing signal Vsync, as shown in FIG. 4. The H counter 26a is reset by the vertical synchronizing signal Vsync so as to count the number of horizontal synchronizing signals Hsync on 1 frame, i.e. the number of horizontal lines. The count value of the H counter 26a is given to a decoder 26b. By this decoder 26b, the memory control circuit 26 outputs a bus release request BUSREQUST to request the CPU 28 to release the bus 22b, as well as a line address strobe signal RAS, a column address strobe signal CAS, a higher-order bit write signal UWE and a lower-order bit write signal LWE. The bus release request BUSREQUEST is supplied to the CPU 28. The memory control circuit 26 also receives a bus grant signal BUSGRANT from the CPU 28. After receiving the bus grant signal BUSGRANT, the memory control circuit 26 supplies to the VRAM 24 the signals RAS and CAS, the higher-order bit write signal UWE, and the lower-order bit write signal LWE, at respective predetermined timing.

The CPU 28 is, for example, a 16-bit CPU having an interrupt terminal 28a. To the interrupt terminal 28a is supplied, for example, a sound interruption from a 5-byte sound register 30.

The sound for a sound memo, is given from a microphone 32 to an A/D converter 34 so that the A/D converter 34 supplies sound data to the sound register 30. Each time 5 bytes of sound data, for example, is loaded onto the sound register 30, a sound interruption is inputted from the sound register 30 to the interrupt terminal 28a of the CPU 28.

The CPU 28 is further connected to the flash memory 38 though a 16-bit bus 22c that is similar to the above-stated bus 22b. This flash memory 38 has a capacity, for example, of 2M bytes, which is a recording medium for recording an operation program for the CPU 28 as well as the images and sounds compressed according to such a compression method as JPEG. Incidentally, other non-volatile RAM than the flash memory may be employed as a memory medium.

The digital camera 10 further includes a shutter button 40, a reproduce/camera mode selecting button 42, a resolution switching button 44, a monitor on-off button 46, a sound memo button 48, an erase button 50, etc. The operating signal from the operating button 40–50 is supplied to a system controller 52. The system controller 52 outputs a predetermined control signal, depending upon the control signal of the buttons 40–50. This control signal is converted into a serial signal by a P/S converter (not shown), and delivered to the interrupt terminal 28a of the above-stated CPU 28.

For example, when the shutter button 40 is depressed, the system controller 52 outputs a shutter signal so that the shutter signal is supplied to the interrupt terminal 28a of the CPU 28. In response thereto, the CPU 28 suspends the inputting (renewal) of the CCD imager 14 so that the CCD imager 14 outputs a still picture signal upon depression of the shutter button 40. Meanwhile, when the reproduce/camera mode selecting button 42 is operated, the system controller 52 outputs a control signal representing either one of a reproducing mode or a camera mode. The control signal is supplied to the CPU 28.

The VRAM 24 has a 16-bit output bus 22d through which the image data read out of the VRAM 24 is supplied to a second signal processing circuit 60. The second signal processing circuit 60, as explained in detail later, includes a color separating circuit and a matrix circuit so as to convert the image data read out of the VRAM 24 into luminance data and chrominance data. The luminance data and the chrominance data outputted from the second signal processing circuit 60 are respectively converted into an analog luminance signal and a chrominance signal by a D/A converter 62. The luminance signal and the chrominance signal from the D/A converter 62 are supplied to the LCD 64 provided on this digital camera 10, or to a TV monitor (not shown) through an output terminal 66.

In order to generate sounds, the digital camera 10 further includes a D/A converter 68 so that the D/A converter 68 converts the sound data loaded on the sound register 30 into an analog sound signal. This sound signal is supplied to an earphone 70 or, a speaker (not shown) or a sound output terminal 71.

Incidentally, where delivering the image data and the sound data obtained through this digital camera 10 to a computer, the image data and the sound data are ouputted through an output terminal 72 connected to the CPU 28.

In the digital camera 10 shown in FIG. 1, a camera mode can be set by the reproduce/camera mode selecting button 42. If the monitor on-off button 46 is operated, as required at this time, it is possible to utilize the LCD 64 as a viewfinder.

In this state, while the shutter button 40 is not depressed, the image data that is obtained by converting into digital data by the A/D converter 18, namely the progressive scan signal from the CCD imager 14, is written into the VRAM 24, for example, in DMA by way of first signal processing circuit 20 and through the buses 22a and 22b.

Figure 5:
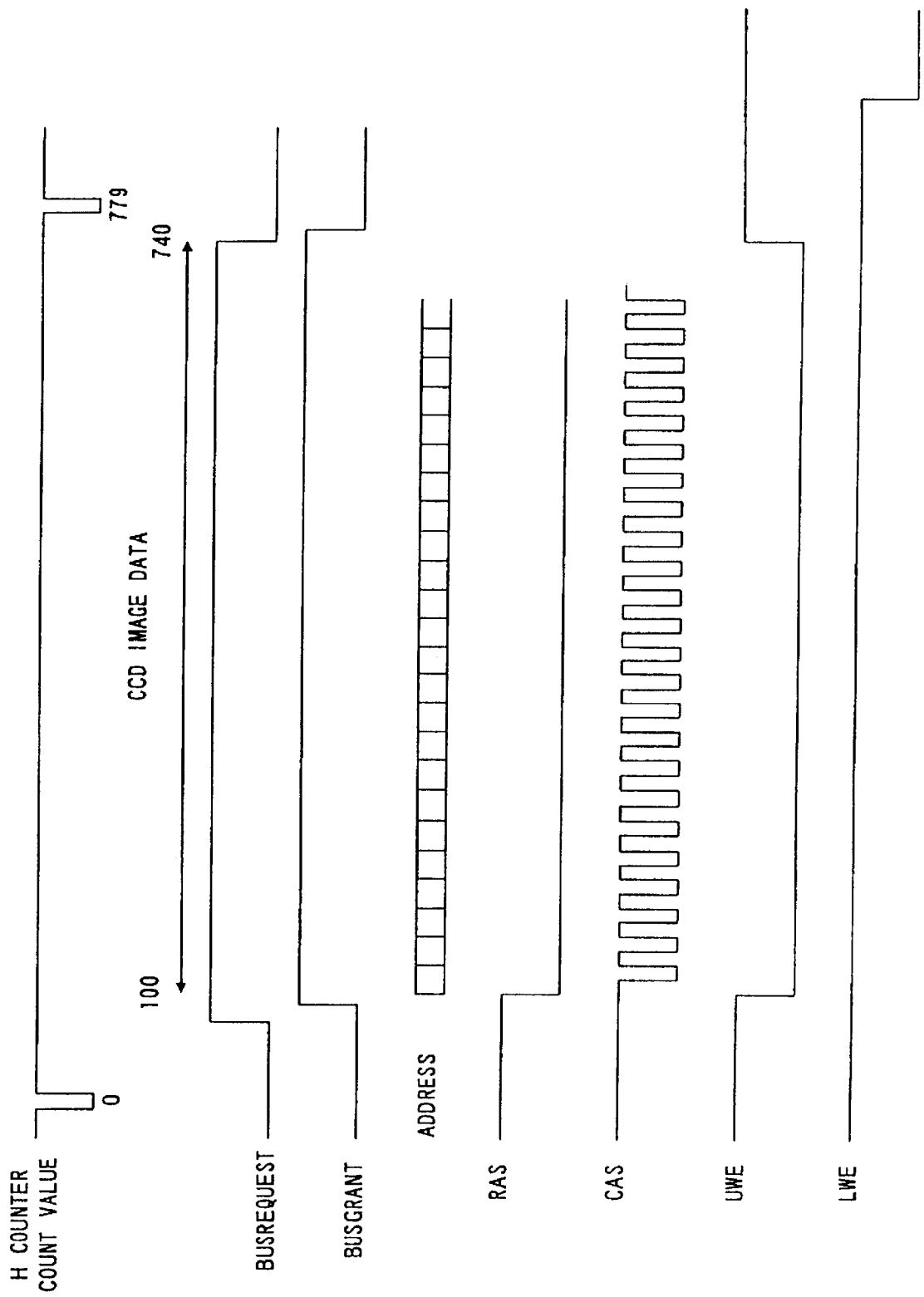
FIG. 5 is a timing chart showing the signals outputted from and inputted to the memory control circuit of FIG. 5.

That is, when the camera mode is set, the CPU 28 notifies the memory control circuit 26 that the camera mode has been set. Accordingly, when the VRAM 24 is written by the image data in a range of 100 lines–740 lines of the CCD imager 14, the memory control circuit 26 outputs a bus release request BUSREQUEST to the CPU 28 as shown in FIG. 5, when the count value of the H counter 26a becomes, for example, "90". The CPU 28 receives this bus release request BUSREQUEST to thereby terminate the process being executed. The CPU 28 sends back a bus grant signal BUSGRANT as shown in FIG. 5 to the memory control circuit 26 to release the bus 22b by the time that the count value of the H counter 26a becomes "100". The memory control circuit 26 designates sequential addresses of the VRAM 24, and outputs a higher-order bit write signal UWE and a lower-order bit write signal LWE at predetermined timing as shown in FIG. 5. Consequently, the VRAM 24 is written at the higher-order 8 bits by an odd-line image data and at the lower-order 8 bits by the image data on the even line adjacent to the same odd line.

Figure 6:
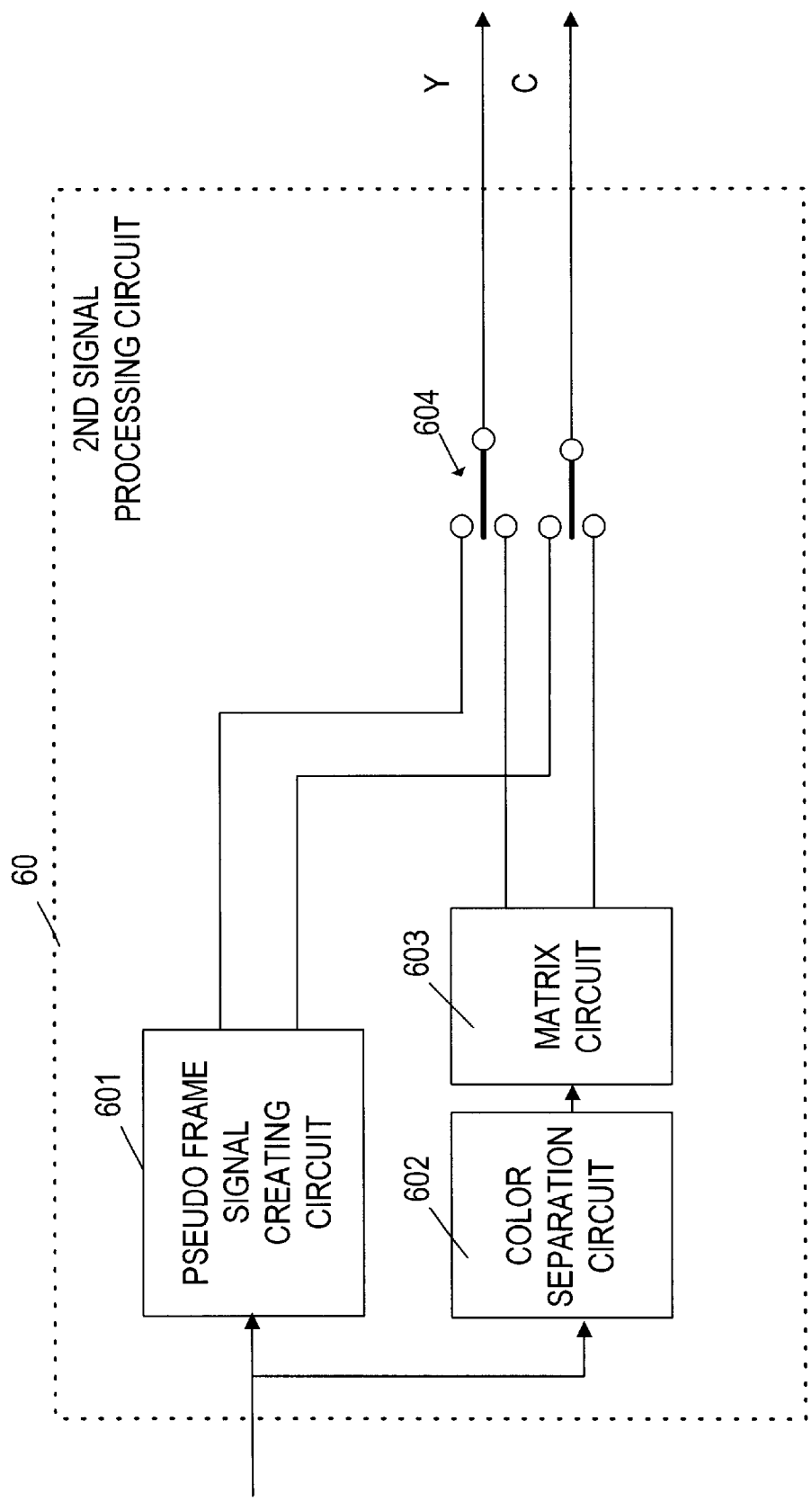
FIG. 6 is a block diagram showing one example of a second signal processing circuit in the FIG. 1 embodiment.

On the other hand, since a column address strobe signal CAS is outputted as shown in FIG. 5, the VRAM 24 at respective memory sites is written by the odd and even lines of the image data, and thereafter these image data are simultaneously read out of the respective addresses. The image data read from the VRAM 24 is outputted to the output bus 22d. The image data read out at an odd field becomes odd field related data, while the image data read out at an even field becomes even field related data. The second signal processing circuit 60 that receives the image data from the VRAM 24 includes a pseudo frame signal creating circuit 601 as shown in FIG. 6. This pseudo frame signal creating circuit 601 is utilized for a reproducing mode. The second signal processing circuit 60 further includes a color separating circuit 602 and a matrix circuit 603. The color separating circuit 602 and the matrix circuit 603 cooperatively constitute a frame signal creating circuit, and utilized for a camera mode. Accordingly, a switch 604 selects an output (luminance data and chrominance data) of the matrix circuit 603 when it is in the camera mode, and an output of the pseudo frame signal creating circuit 601 when it is in the reproducing mode.

Figure 7:
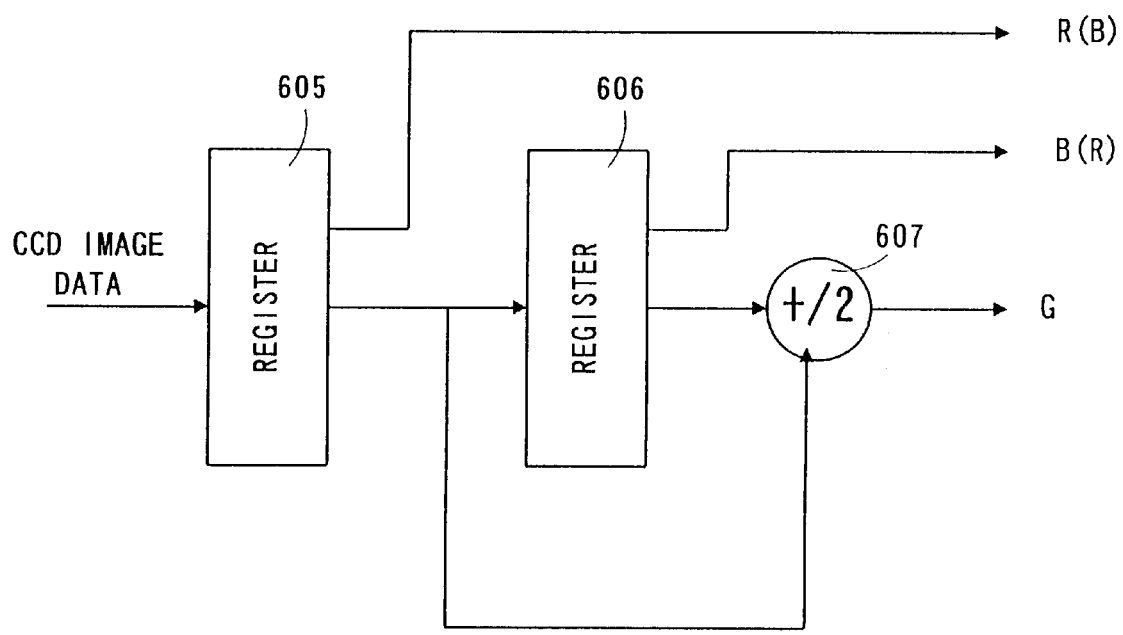
FIG. 7 is a block diagram showing one example of a color separation circuit in the FIG. 6 embodiment.

The color separating circuit 602 that actuates in the camera mode includes, as shown in FIG. 7, two 8-bit registers 605 and 606 and an averaging circuit 607. That is, the odd-line image data and the even-line image data (respectively in 8 bits), that are simultaneously read out of a current address in the VRAM 24, are loaded onto respective registers 605 and 606. Consequently, if the odd-line image data contains an R (B) component, the R (B) component data is outputted as R (B) signal data as it is from the register 606. If the even-line image data has a B (R) component, the B (R) component data is outputted as B (R) signal data as it is from a register 605. The G component data contained in the odd-line image data and the G component data contained in the even-line image data are both supplied to the averaging circuit 607. In the averaging circuit 607, these two G components data are added together, and then the result of addition is rendered ½, so that an average value, of the G component contained in the odd line and the G component contained in the even line, is outputted as a G signal data from the averaging circuit 607.

In this manner is created interlace-scanned RGB data. For an even-numbered field, RGB data is obtained by using vertical two lines of image data (even-numbered field related data) read out of the VRAM 24. For an odd-numbered field, RGB data is obtained by using the image data (odd-numbered field related data) of the two lines that are lower by one line from the two lines used for the even-numbered field.

The matrix circuit 603 receives an R signal data, a B signal data and a G signal data outputted from the color separating circuit 602 to output, according to a predetermined calculation, luminance data, i.e., Y data and chrominance data, i.e., color difference signals (R−Y, B−Y). The luminance data and the chrominance data are supplied to the LCD 64 through a D/A converter 62. Accordingly, the LCD 64 displays a color picture according to the image signal from the CCD imager 14, thus being utilized as a viewfinder. That is, before depressing the shutter button 40, the VRAM 24 is renewed by the CCD imager 14 i.e. the image data from the first signal processing circuit 20 so that the LCD 64 functions as a viewfinder.

When the shutter button 40 is depressed, the system controller 52 outputs a shutter signal which is supplied to the interrupt terminal 28*a* of the CPU 28. Consequently, the CPU 28 freezes the CCD imager 14. Therefore, the VRAM 24 is written by the image data occurring upon finally depressing the shutter button 40 in the above-stated manner. Thus, the LCD 64 displays a still picture at a time of depressing the shutter button 40.

In this camera mode, the image data stored in the VRAM 24 is converted into luminance data (Y) and chrominance data (B−Y and R−Y) by the CPU 28, according to a well known method, e.g. JPEG. These luminance data (Y) and chrominance data (B−Y and R−Y) are written into the flash memory 38 by way of the bus 22*c*.

In the camera mode, if the shutter button 40 is depressed and immediately the sound memo button 48 is operated so as to input a sound through the microphone 32, the inputted sound is converted into sound data by the A/D converter 34 and then loaded onto the sound register 30. The sound register 30 has a capacity of 5 bytes as stated before. When the sound register 30 is filled up, a sound interruption is supplied from the sound register 30 to the interrupt terminal 28*a* of the CPU 28. The sound interruption is delivered to the CPU 28 on every 5 bytes (i.e. every 10 H). Accordingly, the CPU 28 fetches sound data each time a sound interruption is made, so that the CPU 28 compresses the sound data, e.g. 8 bits into 4 bits, according to a predetermined signal process and temporarily writes the compressed sound data into a predetermined sound area in the VRAM 24.

When the CPU 28 processes to write the image data into the flash memory 38, the CPU 28 cannot write sound data into the flash memory 38. Accordingly, the sound data compressed, according to sound interruption, by the CPU 28 is once written into an appropriate area in the VRAM 24. That is, the writing of the compressed sound data into the VRAM 24 is carried out in parallel with the writing of the compressed image data into the flash memory 38.

When the CPU 28 has processed a predetermined time period, e.g. 6 seconds, of sound data, the CPU 28 writes 6 seconds of sound data cumulated in the VRAM 24 into the flash memory 38. By writing a head address to which sound data is written to a region previously written with image data, the CPU 28 can thereafter determine whether a sound memo related to an image is recorded or not.

In camera mode, after the image data from the first signal processing circuit 20 has been written into the VRAM 24, the memory control circuit 26 cancels the buffer release request BUSREQUEST so that the CPU 28 can access to the VRAM 24 through the bus 22*b*. Therefore, the VRAM 24 can be utilized as a working memory for the CPU 28.

When selecting a reproducing mode by the reproduce/camera mode selecting button 42, a reproducing mode signal is supplied to the CPU 28. In the reproducing mode, the CPU 28 reads the image data, i.e. the luminance data and the chrominance data, out of the flash memory 38 through the bus 22*c* to write the image data, i.e. the luminance data and the chrominance data, to a predetermined area of the VRAM 24 through the bus 22*b*. The CPU 28 expands the image data once written in the VRAM 24, according to a predetermined signal process, e.g. JPEG. The expanded image data is written into the VRAM 24. Therefore, reproduced image data is outputted from the VRAM 24 so that it is supplied through the second signal processing circuit 60 and the D/A converter 62 to the LCD 64, for displaying a reproduced image.

When expanding the luminance data and the chrominance data read from the flash memory 38 by the CPU 28 to write again onto the VRAM 24, the luminance data is written to the higher-order 8 bits of the memory site in the VRAM 24, while the chrominance data is written to the lower-order 8 bits thereof.

Of the lower-order 8 bits of the VRAM 24, 2 bits may be written by character information CC. The character information CC, in this embodiment, is a color code representing in what color the character should be represented, for example, in screen representation. For example, if "00" is written as character information, a character is displayed in a color determined by the chrominance data. If the character information is "01", "10" or "11", the character is displayed in a color determined forcibly by the character information.

In the reproducing mode, the sound data read out of the flash memory 38 is expanded similarly to the image data by the CPU 28, and then outputted through the interrupt terminal 28*a* of the CPU 28 to the sound register 30. Accordingly, the sound memo written in the flash memory 38 is reproduced through the earphone 70 or the sound output terminal 71.

In the reproducing mode, if the shutter button 40 or the erase button 50 is operated in a state that the LCD 64 is displaying a reproducing image, the CPU 28 responds to the same operation and erases the image data of the picture from the flash memory 38.

As shown in FIG. 8, the reproducing image data written in the VRAM 24 is read by 16 bits at one time, so that Y data, B−Y data and R−Y data are obtained in pixel orders. However, since the VRAM 24 is small in capacity, the VRAM 24 in this embodiment can store only 1 field of image data. Consequently, a same image is reproduced at the even-numbered field and the odd-numbered field. However, it is possible to analogously create frame image data by using a pseudo frame signal creating circuit 601 shown in FIG. 9.

Figure 9:
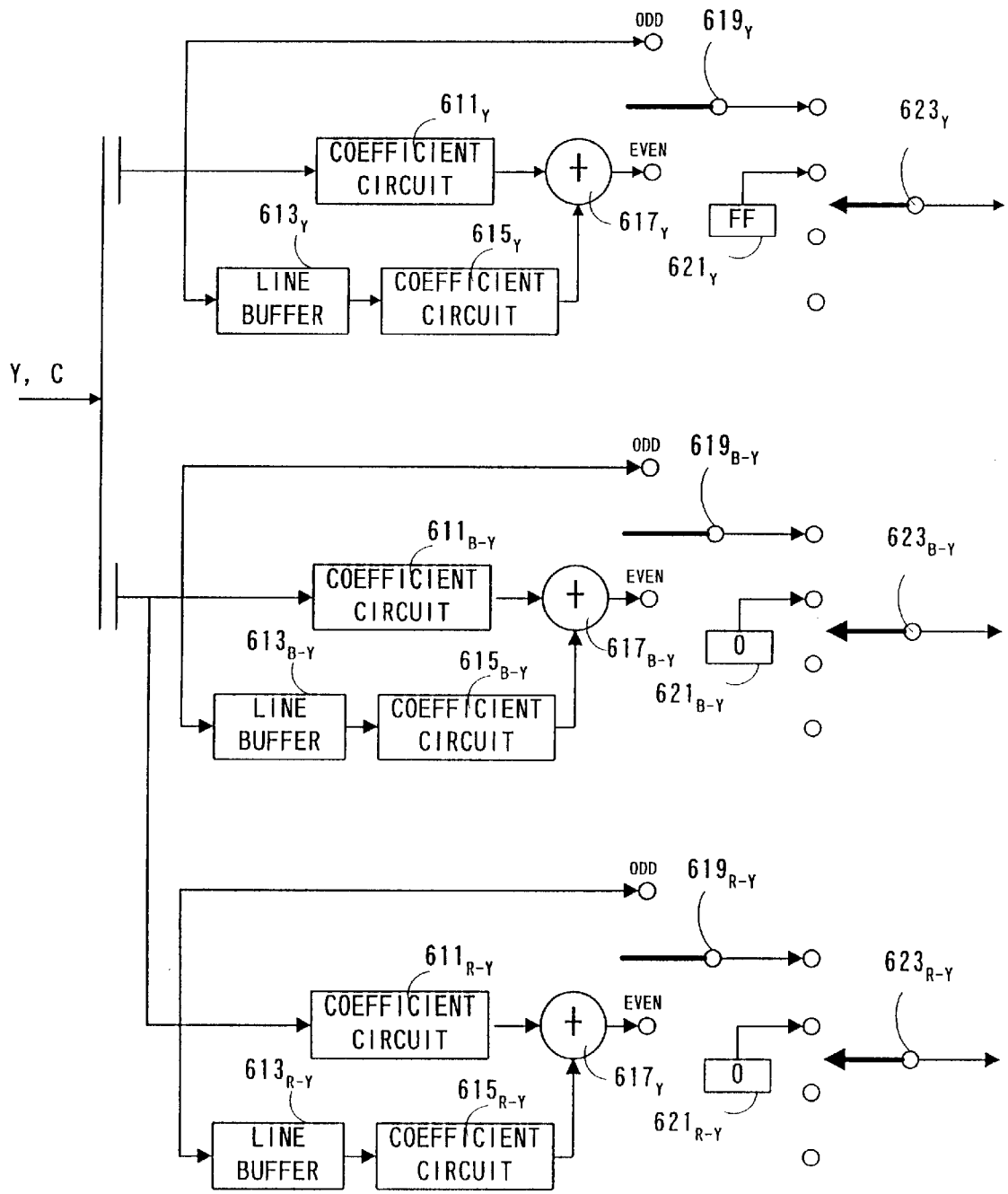
FIG. 9 is a block diagram showing one example of a pseudo frame signal creating circuit in the FIG. 6 embodiment.

Referring to FIG. 9, explanations will be made on the pseudo frame signal creating circuit 60 in a reproducing mode. Although the pseudo frame signal creating circuit 60 includes respective processing circuits for processing Y data, B–Y data and R–Y data, the same processing circuit can be utilized therefor. Accordingly, a luminance data processing circuit only will be explained in detail hereinbelow as a representation of the others. The bottom affix "Y" represents a component for constituting the luminance data processing circuit. The bottom affix "B–Y" denotes a component constituting a color difference (B–Y) data processing circuit. The bottom affix "R–Y" shows a component constituting a color difference (R–Y) data processing circuit.

Figure 10:
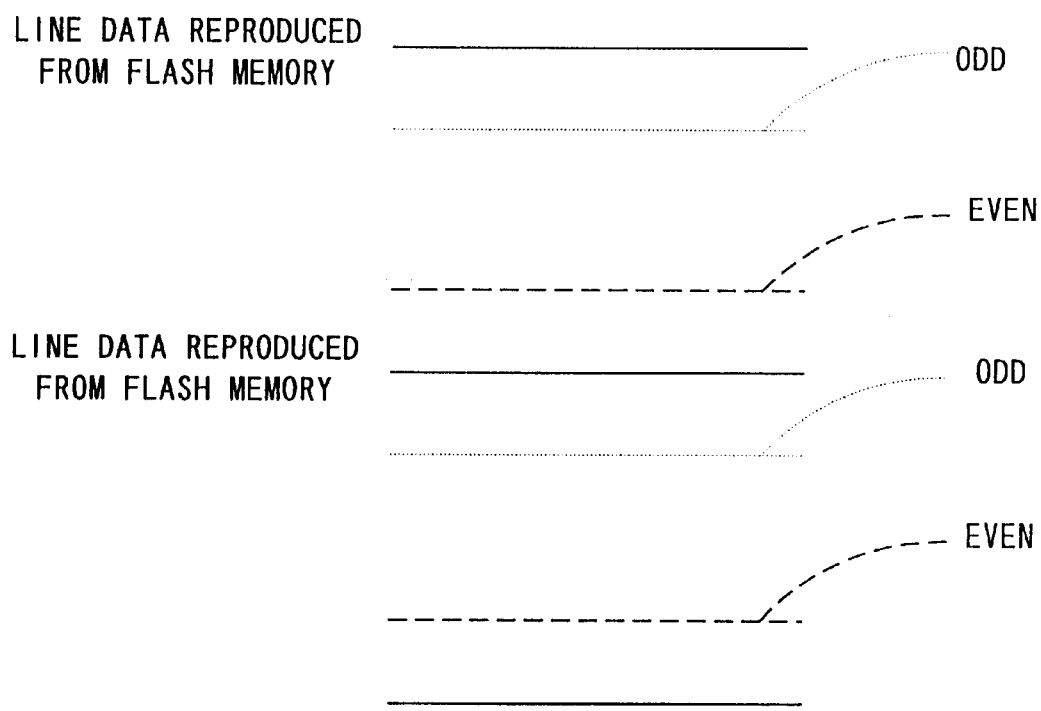
FIG. 10 is an illustrative diagram showing one example of weight coefficient imposed by a coefficient circuit in the FIG. 9 embodiment.

The luminance (Y) data read from the higher-order 8 bits of the VRAM 24 is supplied to a coefficient circuit $611_Y$ and a line buffer $613_Y$. The luminance data outputted from line buffer $613_Y$ is supplied to a coefficient circuit $615_Y$. The coefficient circuits $611_Y$ and $615_Y$, as shown in FIG. 10, are for changing a weight coefficient, used in an adder $617_Y$, between a current line and a previous line for an even-numbered field or an odd-numbered field. Specifically, for the even-numbered field, the image of the preceding line is multiplied by 0.25 while the image data of the current line is multiplied by 0.75. For an odd-numbered field, the image data of a previous line is multiplied by 0.75, and the image data of a current line is multiplied by 0.25. This provides the change of image data, i.e. pictures, between the even-numbered field and the odd-numbered field.

In this manner, the current line luminance data and the preceding line luminance data thus added with a weight coefficient by the coefficient circuits $611_Y$ and $615_Y$ are added together by the adder $617_Y$, and then supplied to one input EVEN of a switch $619_Y$. The other input ODD of the switch $619_Y$ is supplied by the image data of each line read from the VRAM 24. The switch $619_Y$ selects the other input ODD when the field is at an odd number, and the one input EVEN when the field is at an even number. Therefore, the switch $619_Y$ outputs a frame image of Y data created in a pseudo manner.

Incidentally, a register $621_Y$ is used to set Y data in conformity to character information, as stated above, read out of the VRAM 24. For example, if the register $621_Y$ is set by "11", a switch $623_Y$ selects the data of the register $621_Y$, instead of the Y data from the switch $619_Y$, in order to display the character in a "white color".

Although explanations were made on the embodiment that the electronic image recording apparatus is a digital camera, this invention is also applicable to an arbitrary electronic image recording apparatus having a recording medium for recording thereon images and sounds related thereto.

Figure 11:
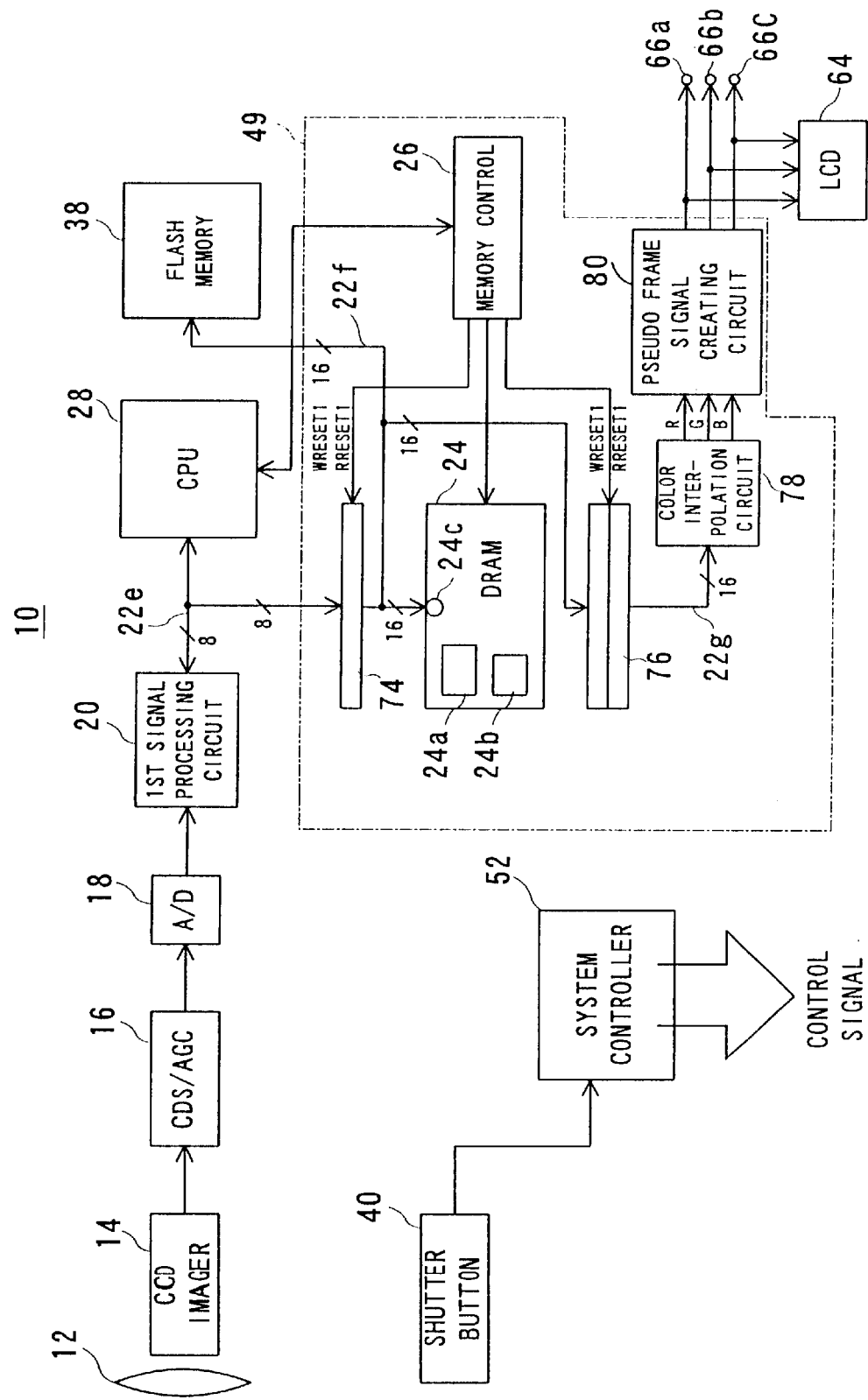
FIG. 11 is a block diagram showing another embodiment of this invention.

Referring to FIG. 11, a digital camera 10 of this embodiment includes a lens 12. Through this lens 12 is given an optical image which is converted into an electric signal by a CCD imager 14. The CCD imager 14 is provided with a color filter 13 as shown in FIG. 2. This color filter 13 has a plurality of filter elements that are in a primary color Bayer arrangement. On odd-numbered lines, an R filter element and a G filter element are alternately arranged at every one pixel, while on even-numbered lines a G filter element and a B filter element are alternately arranged at every one pixel.

The filter elements are correspond to pixels in a 1-to-1 relation so that an image signal outputted from the imager 14 has one color component for one pixel.

The CCD imager 14 reads out an image signal by progressive scanning so that the image signal (progressive scan signal) is supplied to a CDS/AGC circuit 16. The CDS/AGC circuit 16 subjects well-known noise removal and level adjustment to the inputted image signal. The image signal thus processed is converted into digital data, i.e. image data by an A/D converter 18. The image data is subjected to well-known white-balance adjustment and gamma-correction by a first signal processing circuit 20. The first signal processing circuit 20 supplies the processed image data to a line memory 74 included in a signal converting circuit 49 through an 8-bit bus 22e. This line memory 74 is configured by an SRAM having a capacity of one line.

A memory control circuit 26 writes the image data 1-by-1 line into the line memory 74 according to DMA (Direct Memory Access), and thereafter reads it out. The writing operation is carried out according to a pixel clock (reference clock), while the reading operation is executed by a high-speed clock having a rate twice that of the pixel clock. The writing and reading operations are simultaneously started, and reading operation is ended at a time that a ½ line (½ H) of image data have been written.

The line memory 74 and the DRAM 24 are connected therebetween by a 16-bit bus 22f. A memory area 24a has addresses each having 16 bits. When the line memory 74 is stored with an odd-numbered line image data, the memory control circuit 26 inputs the image data to the DRAM 24 by using higher-order 8 bits of the bus 22f. When the line memory 74 is stored with an even-numbered line image data, the memory control circuit 26 inputs the image data to the DRAM 24 by using lower-order 8 bits of the bus 22f.

The memory control circuit 26 further writes this image data into the memory area 24a formed in the DRAM 24, according to a high-speed clock. More specifically, the memory area 24a is configured as shown in FIG. 3, wherein an odd-numbered line image data is written in the higher-order 8 bits and an even-numbered line image data is written to the lower-order 8 bits. Consequently, the memory area 24a at each line thereof is written by 2 lines of image data. The writing into the memory area 24a is also performed at the high-speed clock rate that is twice the pixel clock, similarly to the reading operation from the line memory 74. That is, image data on each line is intermittently written into the memory area 24a by using a ½ H period at a first half for each line.

The memory control circuit 26 performs progressive scanning twice per a 2-field period for the memory area 24a. In each scan, the same image data is read out. The image data read out in the first 1-field period is for an odd-numbered field related data, while the image data read out in the next-field period is for an even-numbered field related data. The memory control circuit 26, in a progressive scan, simultaneously reads 2 lines of image data at a high-speed clock rate out of the address of the memory area 24a. Since the DRAM 24 has only a single port 24c, the reading therefrom is during a latter ½ H period of each line in order to prevent interference between the writing into and the reading out of the memory area 24a. That is, reading operations are intermittently made at every other ½ H period.

The 2-line image data read out from the memory area 24a is written at the high-speed clock rate into the line memory 76 through a 16-bit bus 22f. This line memory 76 has a capacity of 2 lines, and structured by an SRAM. The memory control circuit 26 reads the image data at the pixel clock rate out of the line memory 76, each time the writing into the line memory 76 is ended. That is, 2 lines of image data are simultaneously read out during the 1-line period.

Figure 12:
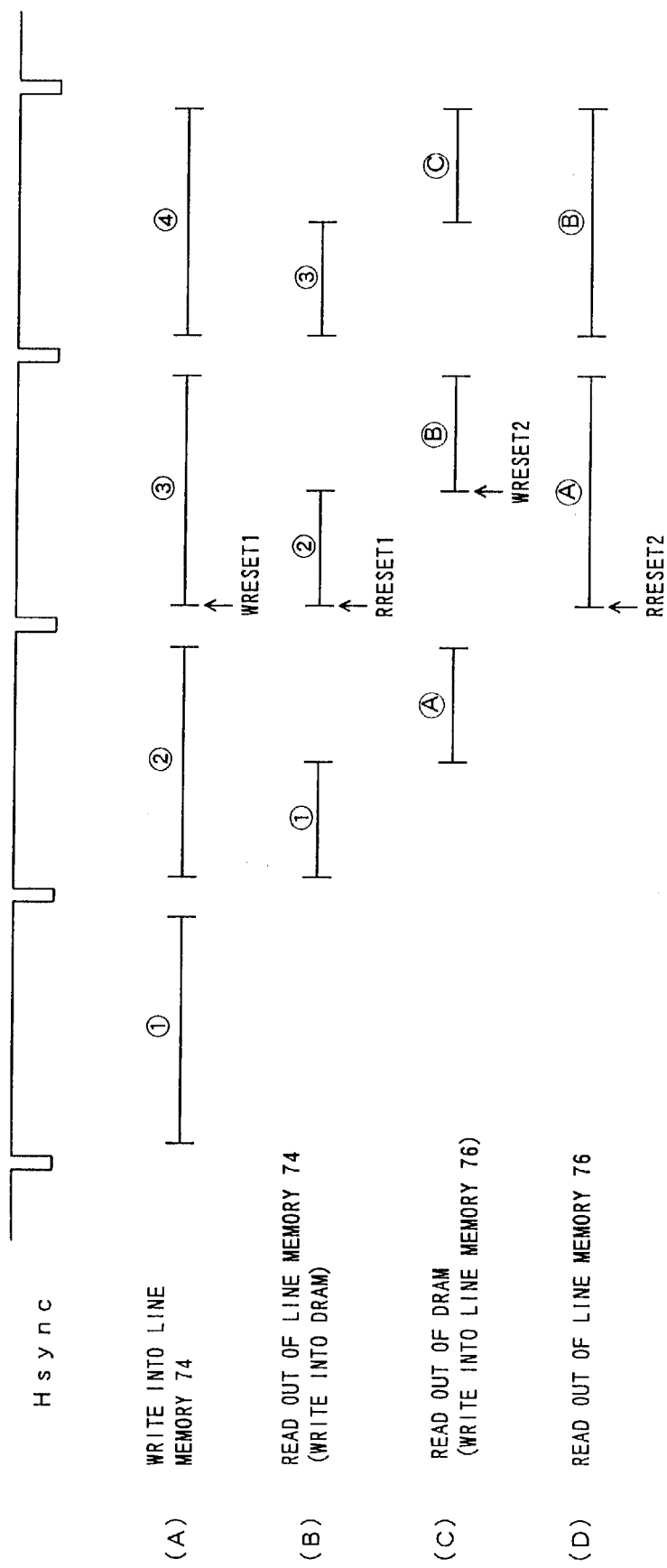
FIG. 12 is a timing chart showing part of the operation by the FIG. 11 embodiment.
Figure 13:
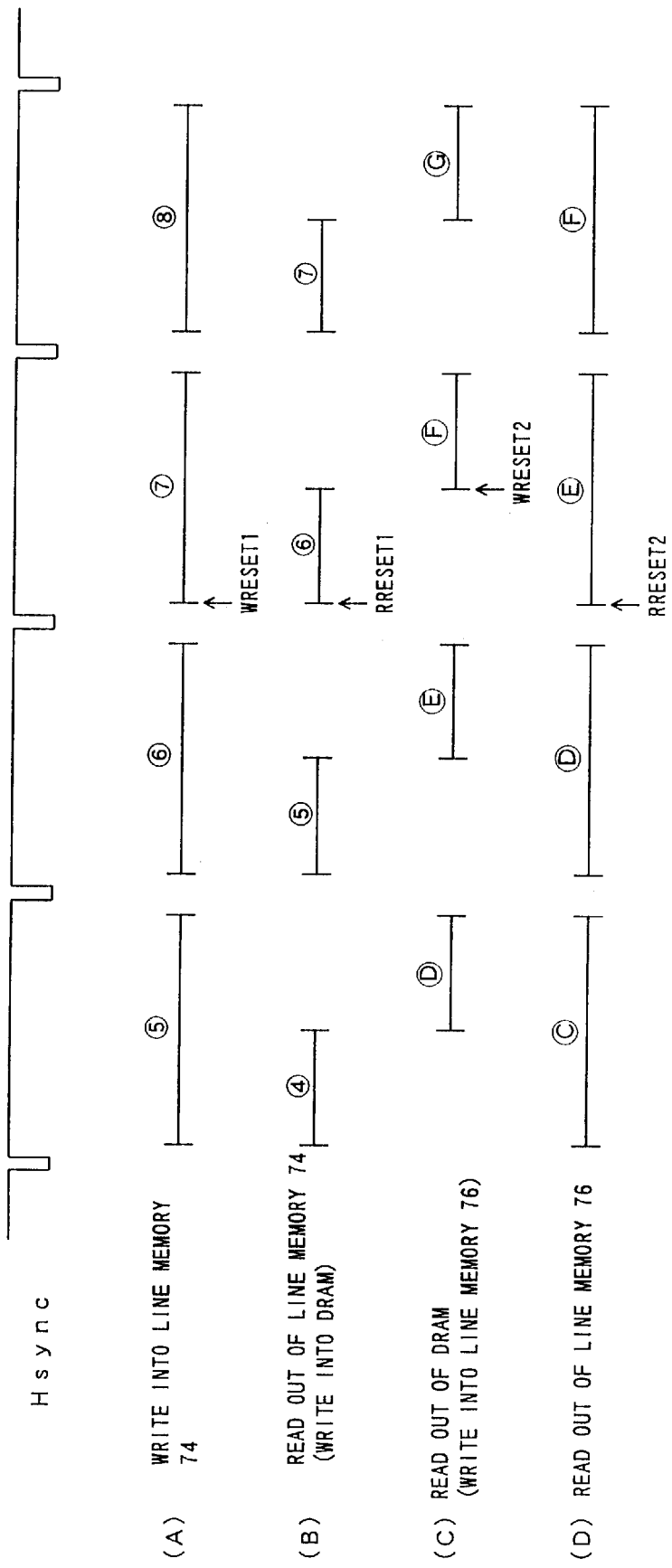
FIG. 13 is a timing chart showing part of the operation by the FIG. 11 embodiment.

Explanations will be made on the operation from writing of image data into the line memory 74 to the reading out of the line memory 76, with reference to FIG. 12 and FIG. 13. Since the line memory 74 is written by image data at the reference clock rate, the writing of 1-line image data requires a 1-line period, as shown in FIG. 12(A) and FIG. 13(A). Incidentally, the writing addresses are reset by a writing reset signal WRESET1 outputted from the memory control circuit 40 at the beginning of a 1H period. As shown in FIG. 12(B) and FIG. 13(B), the reading of the image data having written on the line memory 28 is started simultaneously with the writing of the next line image data. The clock rate at reading is twice of that of writing, so that the read image data is written at the same high-speed clock rate into the memory area 14a. The reading address of the line memory 28 is reset by a reading reset signal RRESET1 outputted at the start of the 1 H period from the memory control circuit 40.

Since the image data is written at the high-speed clock rate into the memory area 24a, a blank occurs at the latter half of the 1 H period. Using this blank period, the reading of the image data from the memory area 24a is executed, as shown in FIG. 12(D) and FIG. 13(D). The clock rate at the reading is also at twice the reference clock rate. The reading address is reset by a reading reset signal WRESET outputted at a time a ½ H period is elapsed from the head of the 1 H period. The image data outputted from the memory area 24a is written at the same high-speed clock rate as the above into the line memory 30, and read out at the 1 H period after completing the writing, as shown in FIG. 12(D) and FIG. 13(D). That is, the reading is made at the reference clock rate. Incidentally, the reading address in the line memory 76 is reset by a reading reset signal RRESET2 outputted at the beginning of the 1 H period.

The 2 lines of image data simultaneously read out of the line memory 76 are inputted to a color interpolation circuit 78 through a 16-bit bus 22g. As understood from FIG. 2, the pixels each have any one of color components R, G, B. Accordingly, two lacking color components for a pixel being considered are interpolated by this color interpolation circuit 78. Due to this, R data, G data and B data are simultaneously outputted on each pixel from the color interpolation circuit 78, and inputted to a pseudo frame signal creating circuit 80.

The pseudo frame signal creating circuit 80 is configured as shown in FIG. 14. The R data of the current line is supplied to coefficient circuits 80a and 80b and a line memory 80c. The R data of the preceding line read from the line memory 80c is inputted to coefficient circuits 80d and 80e. The coefficient circuits 80a and 80b each multiply the inputted data by "10.25", while the coefficient circuits 80d and 80e each multiply the input data by "0.75". A switch SW1 and a switch SW2, at an odd-numbered field, are respectively connected to the coefficient circuits 80a and 80d. They, at an even-numbered field, are respectively connected to the coefficient circuits 80b and 80e. Accordingly, in an odd-numbered field, the current-line R data multiplied by 0.25 and the previous-line R data multiplied by 0.75 are added together by an adder 80f. In an even-numbered field, the current-line R data multiplied by 0.75 and the preceding-line R data multiplied by 0.25 are added together by the adder 80f. Incidentally, the G data and the B data are processed by other systems, but their process operations are the same as that of the R data, omitting duplicated explanation.

Although the odd-numbered field related data and the even-numbered field related data, read from the DRAM 24, are the same as stated above, they are multiplied by the different coefficients depending upon the field, thereby providing image data to be outputted for an odd-numbered line (odd-numbered field image data) and image data to be outputted for an even-numbered line (even-numbered field image data). The image data outputted from the pseudo frame signal creating circuit 80 is supplied to the LCD 64, and outputted through output terminals 66a–66c. Thus, the LCD 64 displays interlace-scanned motion pictures.

Figure 15:
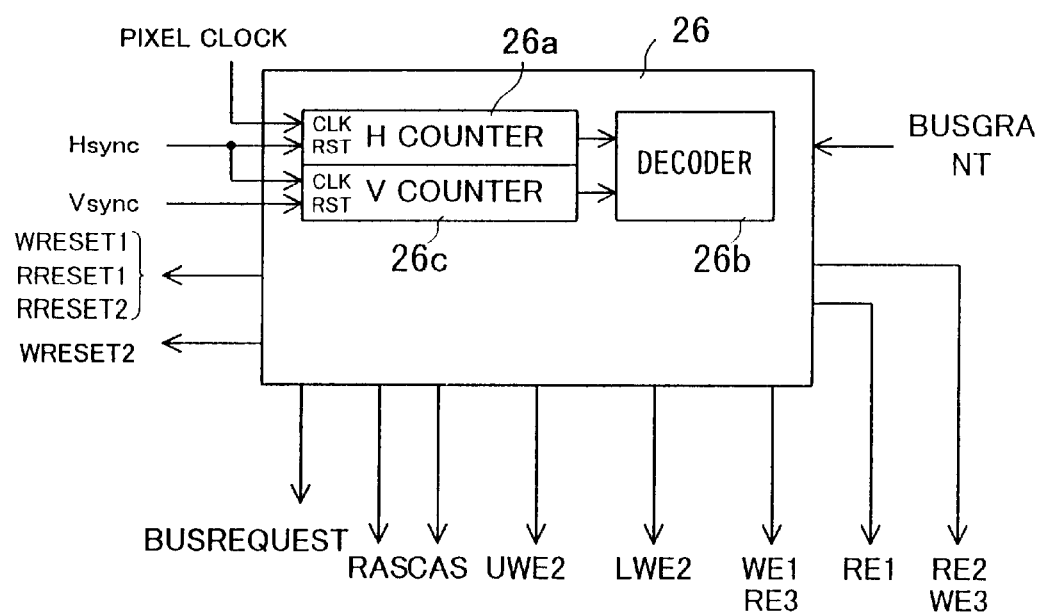
FIG. 15 is a block diagram showing a memory control circuit.

The memory control circuit 26 is configured as shown in FIG. 15. An H counter 26a is incremented by a pixel clock (reference clock), and reset by a horizontal synchronizing signal. That is, the H counter 26a counts the number of pixels in a horizontal direction. Meanwhile, a V counter 26c is incremented by a horizontal synchronizing signal, and reset by a vertical synchronizing signal. That is, the V counter 26c counts the number of lines. A decoder 26b receives count values from the H counter 26a and the V counter 26c, and outputs a bus release request signal BUSREQUEST, a line address strobe signal RAS, a column address strobe signal CAS, a write enable signals WE1, UWE2, LWE1, LWE2, WE3, read enable signals RE1, RE2, RE3, writing reset signals WRESET1 and 2, reading reset signals RRESET1 and 2. Incidentally, a bus grant signal BUSGRANT is inputted depending upon the BUSREQUEST.

Figure 16:
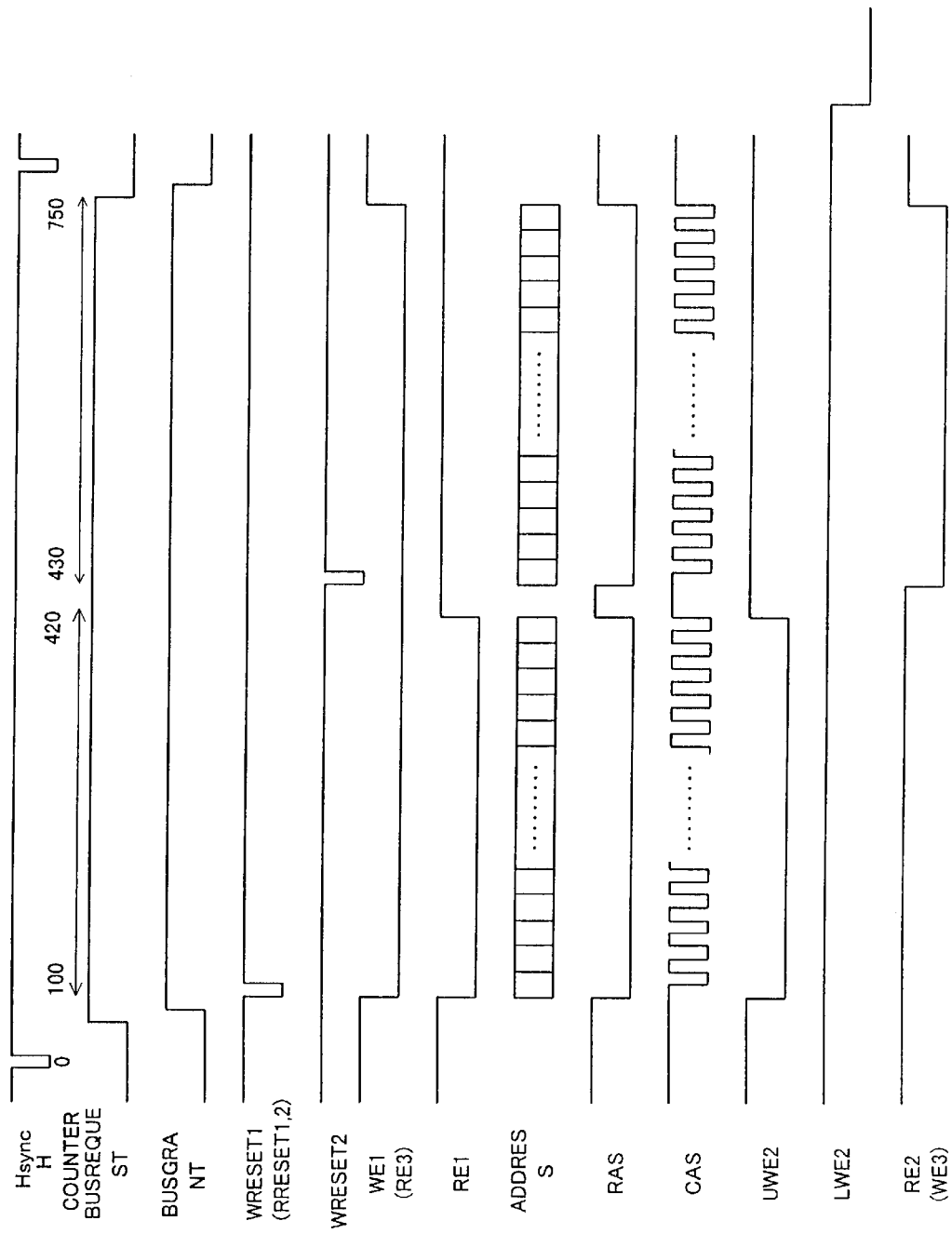
FIG. 16 is a timing chart showing part of the operation by the FIG. 11 embodiment.

Explaining in detail with reference to FIG. 16, the decoder 26b outputs the BUSREQUEST to the CPU 28 when the count value of the H counter 26a becomes "90", and suspends the output thereof at a time that the count value become "750". The CPU 28 receives this BUSREQUEST to send BUSGRANT back to the memory control circuit 40 within a 10-pixel period. That is, the BUSGRANT becomes a high level before the count value of the H counter 26a becomes "100", and returns to a low level before the count value becomes "760". In this manner, the bus 22e is released during a period that the BUSGRANT is at the high level.

When the count value of the H counter 26a becomes "100", the decoder 26b outputs a writing reset signal WRESET1 and reading reset signals RREST1 and 2 for a 1-pixel period to thereby reset the writing address and the reading address in the line memory 74 as well as the reading address in the line memory 76. Meanwhile, when the count value of the H counter 26a becomes "430", a writing reset signal WRESET2 is outputted only for the 1-pixel period to thereby reset the writing address in the line memory 76.

While the count value of the horizontal counter 26a is at "100"–"750", a write enable signal WE1 and a read enable signal RE3 are outputted. The count value of the horizontal counter 26a is at "100"–"420", a read enable signal RE1 is outputted. The count value of the H counter 26a is at "430"–"750", a read enable signal RE2 and a write enable signal LWE3 are outputted. At an odd-numbered line, while the count value of the H counter 26a is at "100"–"420", a write enable signal UWE2 is outputted. At an even-numbered line, while the count value of the H counter 26a is at "100"–"420", a write enable signal WE1 is outputted.

When the write enable signal WE1 is outputted, the writing into the line memory 74 is activated, while when the read enable signal RE1 is outputted, the reading from the line memory 74 is activated. Also, when the write enable signal UWE2 is outputted, the writing into the higher-order 8 bits of the memory area 24a is activated, while when the write enable signal LWE2 is outputted, the writing into the lower-order 8 bits of the memory area 24a is activated. Further, when the read enable signal RE2 is outputted, the reading from the memory area 24a is activated, while when the write enable signal WE3 is outputted, the writing into the line memory 76 is activated. Further, when the write enable signal WE3 is outputted, the writing into the line memory 76 is activated, while when the read enable signal RE3 is outputted, the reading from the line memory 76 is activated. A line address strobe signal RAS and a column address strobe signal CAS are supplied to the DRAM 24. This causes the image data to be written into a desired address in the memory area 24a. Incidentally, the line address strobe signal RAS assumes a low level when the count value of the H counter is at "100"–"420" or "430"–"750". The column address strobe signal CAS is changed over between the high level and the low level at every ½ pixel, in a duration that the count value of the H counter 26a assumes "100"–"420" or "430"–"750".

Figure 17:
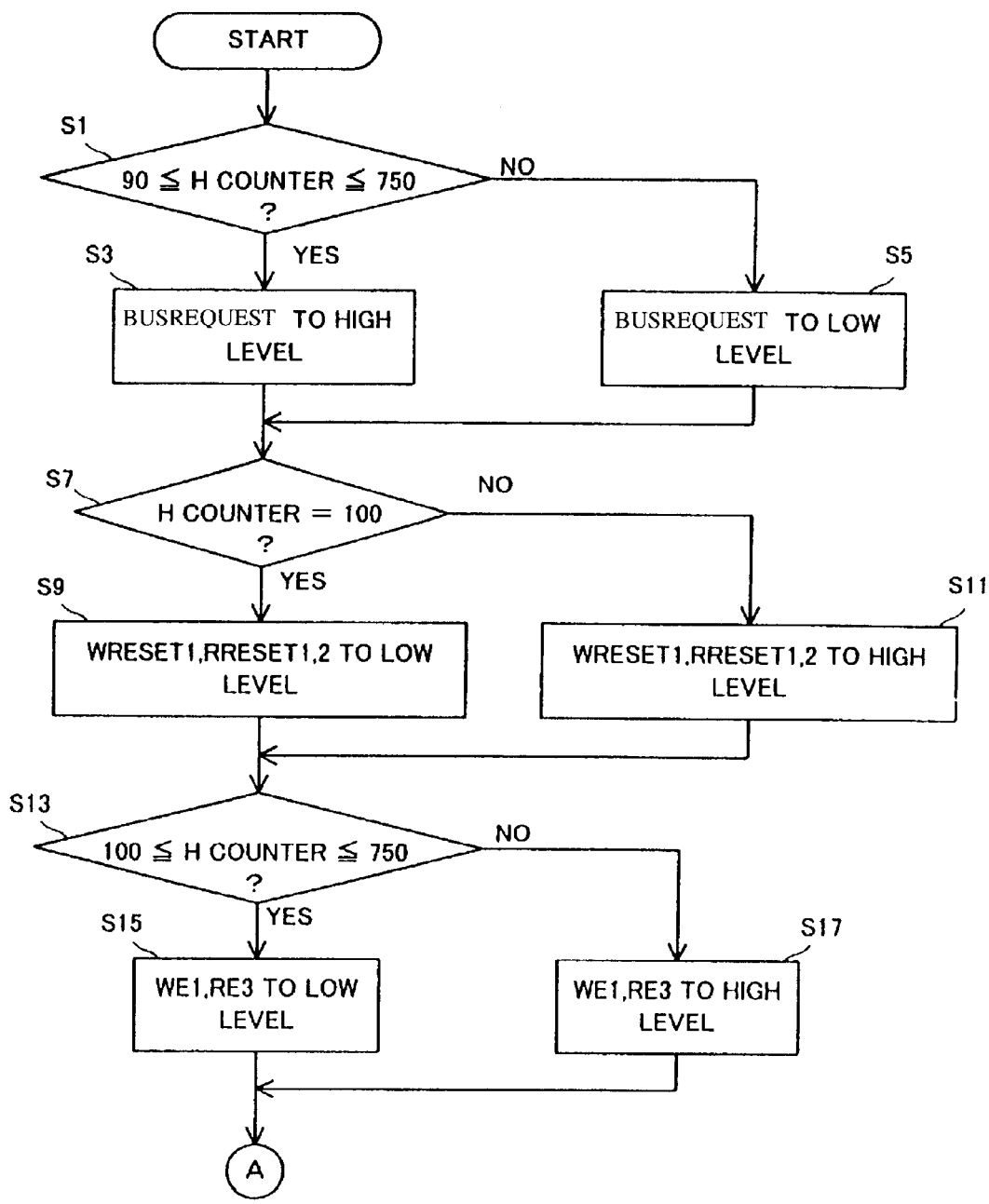
FIG. 17 is a flowchart showing part of the operation by the memory control circuit.
Figure 18:
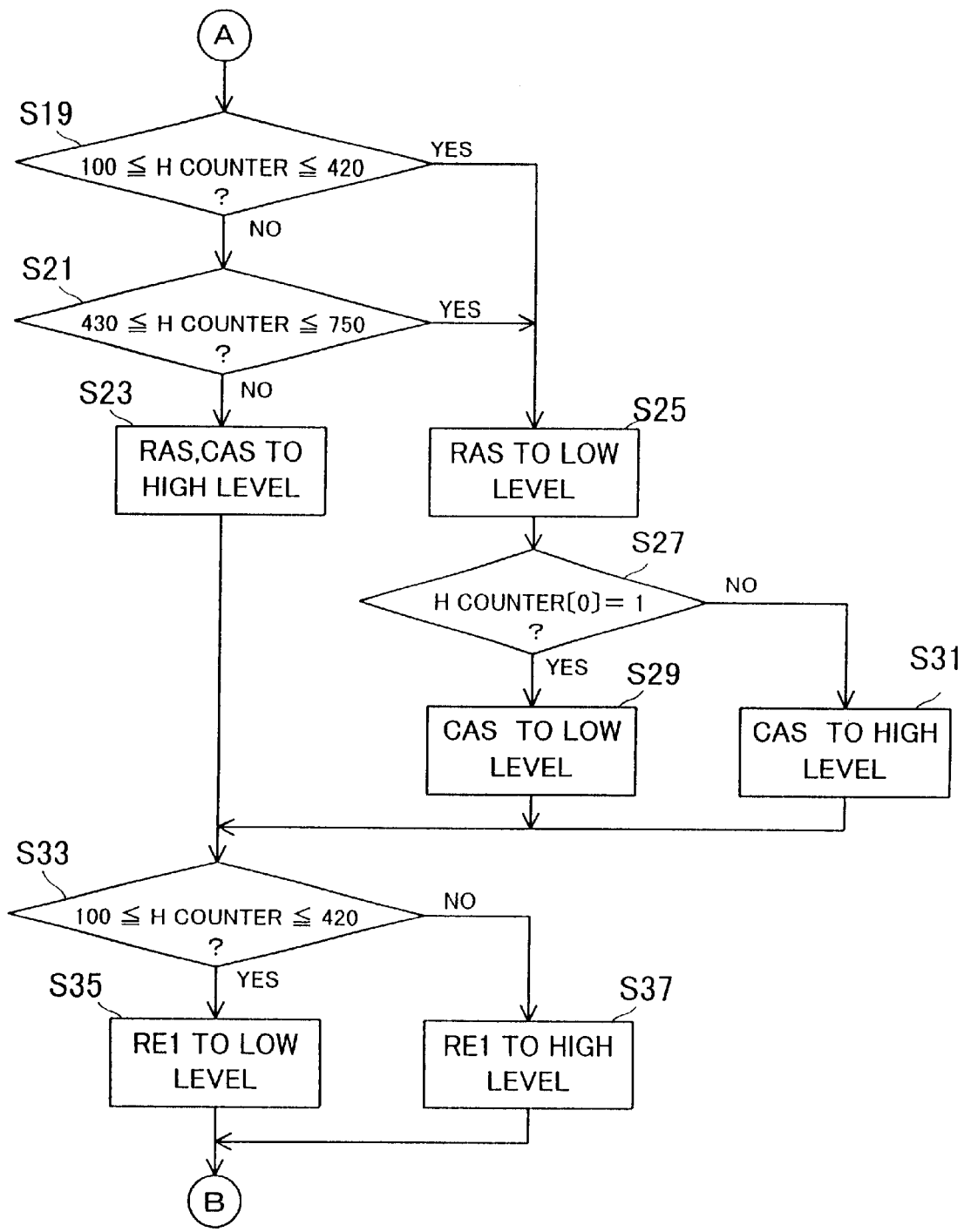
FIG. 18 is a flowchart showing part of the operation by the memory control circuit.
Figure 19:
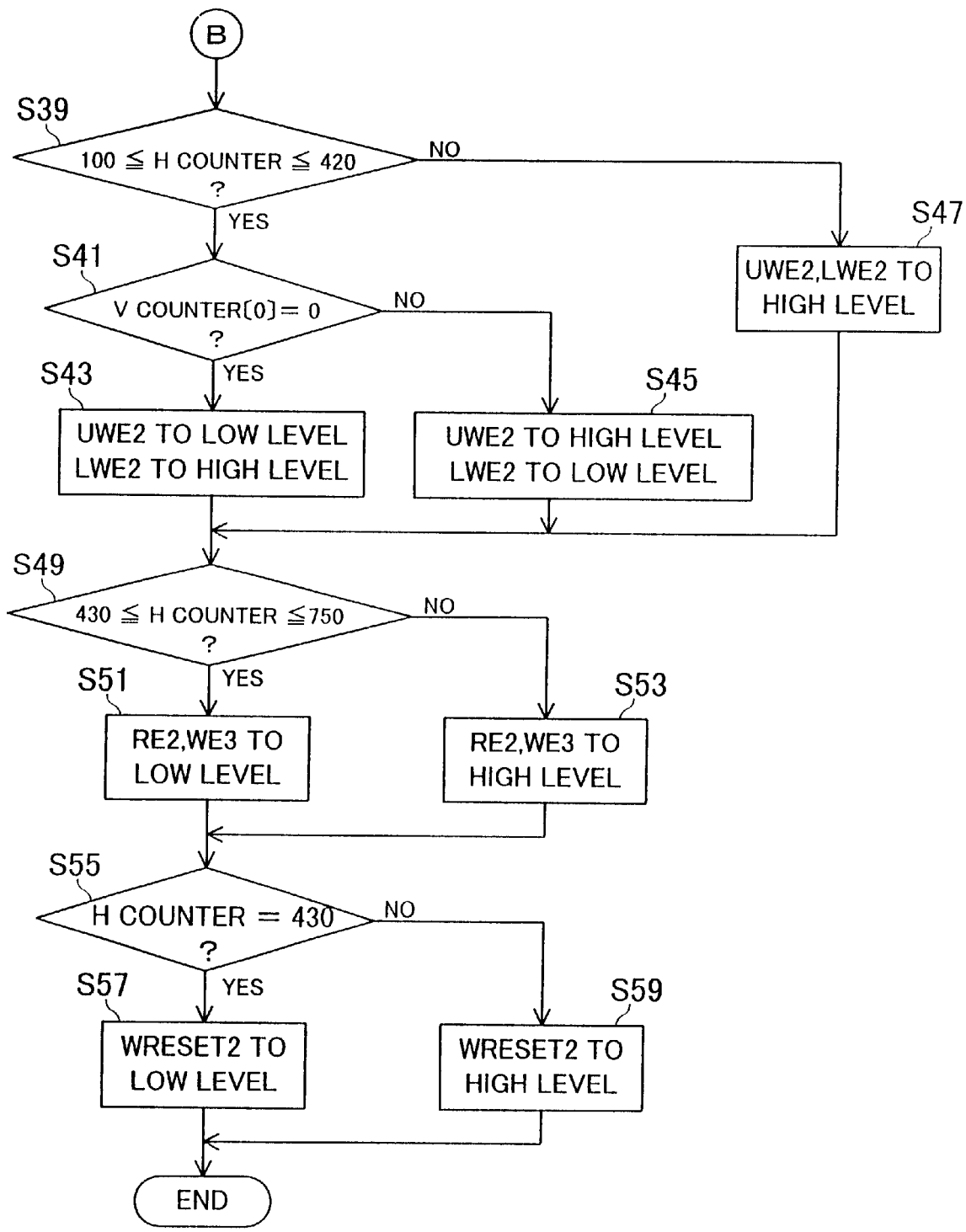
FIG. 19 is a flowchart showing part of the operation by the memory control circuit.

The detailed operation of the decoder 26b will be explained with reference to a flowchart shown in FIG. 17–FIG. 19. The decoder 26b starts the process on each pixel. First, it is determined at a step S1 whether or not the count value of the H counter is "90" ≦count value≦"750". If the determination here is "YES", the BUSREQUEST is put to a high level at a step S3. If "NO", the BUSREQUEST is put to a low level at a step S5. Then, it is determined at a step S7 whether or not the count value of the H counter 26a is "100". If "YES", the WRESET1 and the RRESET1 and 2 are put to a same level at a step S9. If "NO", the WRESET1 and the RRESET1 and 2 are put to a high level at a step S11. Subsequently, it is determined at a step S13 whether the count value of the H counter 26a is "100" ≦count value≦"750". If "YES", the WE1 and the RE3 are put to a low level at a step S15, while if "NO", the WE1 and the RE3 are put to a high level at a step S17.

The decoder 26b further determines at a step S19 whether or not the count value of the H counter 26a is "100" ≦count value≦"420", and determined at a step S21 whether or not it is "430" ≦count value≦"750". If "NO" at both the steps S19 and S21, the RAS and the CAS are put to a high level at a step S23. If "YES" at least one of the steps S19 and S21, the RAS is put to a low level at a step S25. Then, at a step S27 it is determined whether the lowest-order bit of the H counter 26a is "1" or not. If "YES", the CAS is put to the low level at a step S29. If "NO", the CAS is put to the high level at a step S31. It is then determined at a step S33 whether the count value of the H counter 26a is "100" ≦count value≦"420". If "YES", the RE1 is put to the low level at a step S35. If "NO", the RE1 is put to the high level at a step S37.

The decoder 26b thereafter determines at a step S39 whether the count value of the H counter 26a is "100" ≦count value≦"420". If "NO", the UWE2 and the LWE2 are put to the high level at a step S47. On the other hand, if "YES", it is determined whether the lowest-order bit of the V counter 26c is "0" or not. If "YES", the UWE2 and the LWE2 are respectively put to the low level and the high level. If "NO", the UWE2 and the LWE2 are respectively put to the high level and the low level at a step S45. Then, the decoder 26b determines at a step S49 whether or not the count value of the H counter 26a is "430" ≦count value≦"750". If "YES", the RE2 and the WE3 are put to the low level at a step S51. If "NO", the RE2 and the WE3 are put to the high level at a step S53. It is determined at a step S55 whether the count value of the H counter 26a is "430" or not. If "YES", the WRESET2 is put to the low level at a step S57. If "NO", the WRESET2 is put to the high level at a step S59. Thus, the process is ended.

Incidentally, the signal outputted to the memory control circuit 42 are a signal of active low, except for the BUSREQUEST and the BUSGRANT. In this embodiment the writing of image data to the memory area 20a and the reading of image data from the memory area 24a are according to the high-speed clock, so that the signal input/output port requires only one, thereby suppressing the frame memory cost.

Incidentally, when the shutter button 40 is depressed by an operator, the system controller 52 supply a control signal to the CPU 28. In response thereto, the CPU 28 causes the CCD imager 14 to perform so-called pixel mixed reading, based on which the image data stored in the memory area 24a is compressed using a work area 24b, according to a JPEG format. The compressed data is written into the flash memory 38 via the bus 22f.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital camera adapted to convert a progressive scan signal as an image signal into an interlace scan signal, comprising:
   a signal generator for outputting a progressive scan signal;
   a memory for storing the progressive scan signal;
   a bus for connecting said signal generator and said memory;
   a controller for outputting a request signal that requests a release of said bus;
   a CPU operative in response to the request signal to output a grant signal that grants a release of said bus;
   a writer for responding to the grant signal to write the progressive scan signal into said memory; and
   a reader for reading, out of said memory, an odd-numbered field related signal related to an odd-numbered field and an even-numbered field related signal related to an even-numbered field, wherein said memory includes a plurality of locations each of said locations having a plurality of bits, an input port for inputting the progressive scan signal and an output port for outputting the odd-numbered field related signal and the even-numbered field related signal.

2. A digital camera according to claim 1, wherein said writer writes an odd-numbered line of the progressive scan signal into one of higher-order bits and lower-order bits of one of said memory locations, and an even-numbered line of the progressive scan signal into the other of the higher-order bits and the lower-order bits of the one memory location.

3. A digital camera according to claim 2, wherein said reader simultaneously reads image signals written in the higher-order bits and the lower-order bits of-said memory to obtain 1 line of the odd-numbered field related signal or the even-numbered field related signal.

4. A digital camera according to claim 3, further comprising an image sensor having a same color arrangement repeated on every 2 lines; and an RGB signal creator for creating an RGB signal based on the 1 line of the odd-numbered field related signal or the even-numbered field related signal.

5. A digital camera according to claim 1, further comprising a non-volatile RAM, wherein said bus connects said CPU and said non-volatile RAM, said CPU accessing said memory through said bus to create a compressed luminance signal and a compressed chrominance signal based on the image signal stored in said memory, and writing the compressed luminance signal and the compressed chrominance signal into said non-volatile RAM.

6. A digital camera according to claim 5, wherein said CPU reads, out of the non-volatile RAM, and expands the compressed luminance signal and the compressed chrominance signal and stores a resulting expanded luminance signal into one of the higher-order bits and the lower-order bits of said memory and a resulting expanded chrominance signal to the other of the higher-order bits and the lower-order bits.

7. A digital camera according to claim 6, further comprising a pseudo frame signal creator for creating a pseudo frame signal based on the expanded luminance signal and the expanded chrominance signal read out of said memory.

8. A digital camera adapted to convert a progressive scan signal as an image signal into an interlace scan signal, comprising:
- a signal generator for outputting a progressive scan signal;
- a memory for storing the progressive scan signal;
- a bus for connecting said signal generator and said memory;
- a controller for outputting a request signal that requests a release of said bus;
- a CPU operative in response to the request signal to output a grant signal that grants a release of said bus;
- a writer for responding to the grant signal to write the progressive scan signal into said memory; and
- a reader for reading, out of said memory, an odd-numbered field related signal related to an odd-numbered field and an even-numbered field related signal related to an even-numbered field, wherein said writer writes the progressive scan signal at a first high-speed clock rate, that is more than twice a reference clock rate, into said memory, and said reader separately reads the odd-numbered field related signal and the even-numbered field related signal at a second high-speed clock rate, that is more than twice the reference clock rate, from said memory.

9. A digital camera according to claim 8, wherein said memory includes a frame memory having memory locations each having a plurality of bits.

10. A digital camera according to claim 9, wherein said writer writes an odd-numbered line of the progressive scan signal into one of a first half and a latter half of the plurality of bits, and an even-numbered line of the progressive scan signal into the other of the first half and the latter half of the plurality of bits.

11. A digital camera according to claim 10, further comprising a first line memory having a capacity of 1 line, wherein said writer writes the progressive scan signal inputted at the reference clock rate into said frame memory through said first line memory.

12. A digital camera according to claim 9, wherein said reader reads 2 lines of the progressive scan signal at one time from said frame memory to obtain one of the odd-numbered field related signal and the even-numbered field related signal.

13. A digital camera according to claim 12, further comprising a second line memory having a capacity of 2 lines, wherein said reader outputs the odd-numbered field related signal and the even-numbered field related signal at the reference clock rate through said second line memory.

14. A digital camera according to claim 8, wherein the progressive scan signal has one color component for each pixel, said digital camera further comprising a color interpolator for subjecting the odd-numbered field related signal and the even-numbered field related signal to color interpolations.

15. A digital camera according to claim 14, further comprising a multiplier for multiplying the output of said color interpolator by a coefficient depending upon the odd-numbered field or the even-numbered field.

16. A digital camera according to claim 8, wherein the odd-numbered field related signal and the even-numbered field related signal are a same signal.

17. A digital camera according to claim 8, wherein the first high-speed clock rate and the second high-speed clock rate are a same rate.

18. A digital camera according to claim 8, wherein said frame memory has a single port, the progressive scan signal being inputted through said port, and the odd-numbered field related signal and the even-numbered field related signal being outputted through said port.

19. A digital camera, comprising:
- an image sensor;
- an image data generator for outputting image data based on an image signal from said image sensor;
- a memory having a plurality of memory locations each configured by a plurality of bits, and an input port and an output port correspondingly connected to a writing bus and a reading bus;
- a CPU;
- an interconnection bus for connecting an output of said image data generator, said writing bus and said CPU;
- a memory controller for outputting a bus release request to said CPU to write the image data from said image data generator through said interconnection bus to said memory; and
- an output circuit for processing the image data outputted from said reading bus; and wherein:
- said image data generator outputs 1 frame of image data including an odd-numbered line and an even-numbered line;
- one of the odd-numbered line and the even-numbered line of the image data being stored into higher-order bits of one of said memory locations and the other of the odd-numbered line and the even-numbered line of the image data being stored into lower-order bits thereof; and
- the image data in the higher-order bits and the lower-order bits of said one memory location being simultaneously read out and supplied through said reading bus to said output circuit.

20. A digital camera according to claim 19, wherein
- said image sensor has a color filter having a same color arrangement repeated on every two lines; and
- said output circuit has an RGB signal creating circuit for creating an RGB signal by utilizing the image data of the odd-numbered line and the even-numbered line simultaneously applied thereto.

21. A digital camera according to claim 19, further comprising a non-volatile RAM connected to said CPU, wherein said CPU accesses said memory through said interconnection bus so as to create and write compressed luminance data and compressed chrominance data based on the image data into said non-volatile RAM.

22. A digital camera according to claim 21, wherein said CPU reads out, from the non-volatile RAM, and expands the compressed luminance data and the compressed chrominance data and stores expanded luminance data into one of the higher-order bits and the lower-order bits of the one memory location and expanded chrominance data into the other of the higher-order bits and the lower-order bits thereof; and
- said output circuit has a pseudo frame signal creator for creating a pseudo frame signal based on the expanded luminance data and the expanded chrominance data read out of said memory through said reading bus.

* * * * *